United States Patent
Mayes et al.

(10) Patent No.: US 10,023,480 B2
(45) Date of Patent: Jul. 17, 2018

(54) CARBON COMPOSITION WITH HIERARCHICAL POROSITY, AND METHODS OF PREPARATION

(71) Applicant: UT-BATTELLE, LLC, Oak Ridge, TN (US)

(72) Inventors: Richard T. Mayes, Knoxville, TN (US); Sheng Dai, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 246 days.

(21) Appl. No.: 14/496,227

(22) Filed: Sep. 25, 2014

(65) Prior Publication Data
US 2015/0047983 A1 Feb. 19, 2015

Related U.S. Application Data

(62) Division of application No. 13/046,836, filed on Mar. 14, 2011, now Pat. No. 8,865,351.

(51) Int. Cl.
| | |
|---|---|
| C02F 1/46 | (2006.01) |
| C02F 1/469 | (2006.01) |
| H01M 4/62 | (2006.01) |
| B82Y 30/00 | (2011.01) |
| C01B 32/05 | (2017.01) |
| C01B 32/20 | (2017.01) |
| C02F 1/461 | (2006.01) |
| H01G 11/24 | (2013.01) |
| H01G 11/42 | (2013.01) |

(52) U.S. Cl.
CPC ............ *C02F 1/4691* (2013.01); *B82Y 30/00* (2013.01); *C01B 32/05* (2017.08); *C01B 32/20* (2017.08); *H01M 4/625* (2013.01); *C01P 2004/60* (2013.01); *C01P 2004/61* (2013.01); *C01P 2004/62* (2013.01); *C01P 2004/64* (2013.01); *C01P 2006/12* (2013.01); *C01P 2006/16* (2013.01); *C02F 1/4604* (2013.01); *C02F 2001/46138* (2013.01); *C02F 2201/002* (2013.01); *H01G 11/24* (2013.01); *H01G 11/42* (2013.01); *Y10T 428/249967* (2015.04)

(58) Field of Classification Search
CPC .................................................. C02F 1/4691
See application file for complete search history.

(56) References Cited

U.S. PATENT DOCUMENTS

| | | | |
|---|---|---|---|
| 4,439,349 A | 3/1984 | Everett et al. | |
| 5,538,611 A * | 7/1996 | Otowa | ................... B01J 19/087 204/518 |
| 5,636,437 A | 6/1997 | Kaschmitter et al. | |
| 5,776,633 A | 7/1998 | Mrotek et al. | |
| 5,932,185 A | 8/1999 | Pekala et al. | |
| 5,954,937 A | 9/1999 | Farmer | |
| 5,965,483 A | 10/1999 | Baker et al. | |
| 6,214,204 B1 | 4/2001 | Gadkaree et al. | |
| 6,309,532 B1 | 10/2001 | Tran et al. | |
| 6,350,520 B1 * | 2/2002 | Nesbitt | ..................... B01J 20/20 428/408 |
| 6,778,378 B1 | 8/2004 | Andelman | |
| 7,449,165 B2 | 11/2008 | Dai et al. | |
| 7,766,981 B2 | 8/2010 | Bourcier et al. | |
| 7,835,137 B2 | 11/2010 | Kang et al. | |
| 8,137,957 B2 | 3/2012 | Wenstrup et al. | |
| 2005/0169829 A1 * | 8/2005 | Dai | .......................... B01J 20/20 423/445 R |
| 2006/0057051 A1 | 3/2006 | Dai et al. | |
| 2007/0253887 A1 | 11/2007 | Foley et al. | |
| 2008/0152577 A1 | 6/2008 | Addiego et al. | |
| 2008/0274407 A1 | 11/2008 | Bourcier et al. | |
| 2009/0141422 A1 | 6/2009 | Bourcier | |
| 2009/0208780 A1 | 8/2009 | Sun et al. | |
| 2009/0305138 A1 | 12/2009 | Baca et al. | |
| 2009/0320253 A1 | 12/2009 | Bourcier et al. | |
| 2010/0190639 A1 * | 7/2010 | Worsley | ................. B01J 21/063 502/183 |
| 2012/0234695 A1 | 9/2012 | Mayes et al. | |

OTHER PUBLICATIONS

P. Simon and A. Burke. "Nanostructured Carbons: Double-Layer Capacitance and More" Interface (The Electrochemical Society). vol. 17, Issue 1. Mar. 2008. pp. 38-43.*
S. Alvarez, J. Esquena, C. Solans, A.B. Fuertes. "Meso/Macroporous Carbon Monoliths from Polymeric Foams" Advanced Engineering Materials. Nov. 2004. vol. 6, Issue 11. pp. 897-899.*
Z.-G. Shi, Y.-Q.Feng, L. Xu, S.-L. Da, M. Zhang. "Synthesis of a carbon monolith with trimodal pores" Carbon. vol. 41, Issue 13. 2003 (no month). pp. 2653-2689.*
S. Costacurta, L. Biasetto. "Hierarchical Porosity Components by Infiltration of a Ceramic Foam" Journal of The American Ceramic Society. Jul. 2007. vol. 90, Issue 7. pp. 2172-2177.*
R.T. Mayes, C. Tsouris, J.O. Kiggans Jr., S.M. Mahurin, D.W. DePaoli, S. Dai. "Hierarchical ordered mesoporous carbon from phloroglucinol-glyoxal and its application in capacitive deionization of brackish water." Journal of Materials Chemistry Sep. 7, 2010. vol. 20, Issue 39. pp. 8674-8678.*

(Continued)

*Primary Examiner* — Steven A. Friday
(74) *Attorney, Agent, or Firm* — Scully Scott Murphy & Presser

(57) ABSTRACT

A method for fabricating a porous carbon material possessing a hierarchical porosity, the method comprising subjecting a precursor composition to a curing step followed by a carbonization step, the precursor composition comprising: (i) a templating component comprised of a block copolymer, (ii) a phenolic component, (iii) a dione component in which carbonyl groups are adjacent, and (iv) an acidic component, wherein said carbonization step comprises heating the precursor composition at a carbonizing temperature for sufficient time to convert the precursor composition to a carbon material possessing a hierarchical porosity comprised of mesopores and macropores. Also described are the resulting hierarchical porous carbon material, a capacitive deionization device in which the porous carbon material is incorporated, as well as methods for desalinating water by use of said capacitive deionization device.

21 Claims, 4 Drawing Sheets

(56) References Cited

OTHER PUBLICATIONS

Adelhelm P., et al., "Generation of Hierarchical Meso- and Macroporous Carbon from Mesophase Pitch by Spinodal Decomposition using Polymer Templates", Adv. Mater., 19: 4012-4017 (2007).
Carriazo D., et al., "Block Copolymer assisted synthesis of hierarchical carbon monoliths suitable as supercapacitor electrodes", J. Mater. Chem. 20: 773-780 (2010).
Hou C. H., et al., "Electrosorption capacitance of nanostructured carbon-based materials", Journal of Colloid and Interface Science 302:54-61 (2006).
Huang Y., et al., "One-Step Hydrothermal Synthesis of Ordered Mesostructured Carbonaceous Monoliths With Hierarchical Porosities", Chem. Commun. pp. 2641-2643 (2008).
Huang Y., et al., "Formation of Mesoporous Carbon With a Face-Centered-Cubic Fd3m Structure and Bimodel Architectural Pores from the Reverse Amphiphilic Triblock Copolyer PPO-PEO-PPO", Angew. Chem. Int. Ed., 46: 1089-1093 (2007).
Jung H., et al., "Capacitive Deionization Characteristics of Nanostructured Carbon Aerogel Electrodes Synthesized Via Ambient Drying", Desalination 216:377-385 (2007).
Kudo H., et al., "Molecular Waterwheel (Noria) from a Simple Condensation of Resorcinol and an Alkanedial", Angew. Chem. Int. Ed. 45:7948-7952 (2006).
Lee J., et al., "Recent Progress in the Synthesis of Porous Carbon Materials", Advanced Materials 18(16):2073-2094 (2006).
Liang C., et al., "Dual Phase Separation for Synthesis of Bimodal Meso-/Macroporus Carbon Monoliths", Chem. Mater. 21:2115-2124 (2009).
Liang C., et al., "Mesoporous Carbon Materials: Synthesis and Modification", Angew. Chem. Int. Ed., 47:3696-3717 (2008).
Liang C., et al., "Synthesis of Mesoporous Carbon Materials via Enhanced Hydrogen-Bonding Interaction", J. Am. Chem. Soc. 128:5316-5317 (2006).
Liang C., et al., "Synthesis of a Large-Scale Highly Ordered Porous Carbon Film by Self-Assembly of Block Copolymers", Angew. Chem. Int. Ed., 43:5785-5789 (2004).
Liu C., et al., "Facile Synthesis of Ordered Mesoporous Carbons from F108/Resorcinol-Formaldehyde Composites Obtained in Basic Media", Chem. Commun., pp. 757-759 (2007).
Mayes R. T, et al., "Hierarchical Ordered Mesoporous Carbon from Phloroglucinol-Glyoxal and its Application in Capacitive Deionization of Brackish Water", J. Mater. Chem. 20:8674-8678 (2010).
Meng Y., et al., "Ordered Mesoporous Polymers and Homologous Carbon Frameworks: Amphiphilic Surfactant Templating and Direct Transformation", Angew. Chem. Int. Ed., 44: 2-8 (2005).
Pekala R. W., et al., "Carbon aerogels for electrochemical applications", Journal of Non-Crystalline Solids 225:74-80 (1998).
Ramires E. C., et al., "Biobased composites from glyoxal-phenolic resins and sisal fibers", Bioresource Technology 101:1998-2006 (2010).
Ryoo R., et al., "Ordered Mesoporous Carbons", Advanced Materials 13(9):677-681 (2001).
Tanaka S., et al., "Synthesis of Ordered Mesoporous Carbons with Channel Structure from an Organic-Organic Nanocomposite", Chem. Commun., pp. 2125-2127 (2005).
Wang X., et al., "Preparation of activated mesoporous carbons for electrosorption of ions from aqueous solutions", J. Mater. Chem. 20:4602-4608 (2010).
Wang X., et al., "Facile Synthesis of Ordered Mesoporous Carbons with High Thermal Stability by Self-Assembly of Resorcinol-Formaldehyde and Block Copolymers Under Highly Acidic Conditions", Langmuir 24(14):7500-7505 (2008).
Zhang F., et al., "An Aqueous Cooperative Assembly Route to Synthesize Ordered Mesoporous Carbons with Controlled Structures and Morphology", Chem. Mater. 18:5279-5288 (2006).
Zhang F., et al., "A Facile Aqueous Route to Synthesize Highly Ordered Mesoporous Polymers and Carbon Frameworks with Ia3d Bicontinuous Cubic Structure", J. Am. Chem. Soc. 127:13508-13509 (2005).
Xu P., et al., "Treatment of Brackish Produced Water Using Carbon Aerogel-Based Capacitive Deionization Technology", Water Research 42:2605-2617 (2008).

* cited by examiner

CARBON COMPOSITION WITH HIERARCHICAL POROSITY, AND METHODS OF PREPARATION

CROSS REFERENCE TO RELATED APPLICATIONS

This application is a divisional of U.S. application Ser. No. 13/046,836 filed on Mar. 14, 2011, the contents of which are incorporated herein by reference in their entirety.

This invention was made with government support under Prime Contract No. DE-AC05-00OR22725 awarded by the U.S. Department of Energy. The government has certain rights in the invention.

FIELD OF THE INVENTION

The present invention relates to the field of porous carbon materials, and more particularly, to such carbon materials containing a bimodal or hierarchical porosity.

BACKGROUND OF THE INVENTION

Porous carbon materials have long been used in capacitive deionization (CDI) technology. Capacitive deionization is increasingly being considered for large-scale desalination operations because of its lower operating costs. In CDI, salt water is made to flow between two porous electrodes, typically made of carbon. When an electric field is applied to render the electrodes opposite in polarity, positive ions become incorporated in the negatively-charged electrode while negative ions become incorporated in the positively-charged electrode. The stored ions can be subsequently released into a waste stream by reversing the electrode polarities.

However, CDI technology is currently significantly hampered by the difficulty in producing porous carbon films on a commercial scale in a batch-to-batch repeatable and uniform manner. The porous carbons produced until now (e.g., via resorcinol-formaldehyde reaction) leave little room for optimization and are generally hampered by the presence of microporosity and/or broad mesopore size distributions. Moreover, the porous carbon films currently in use in CDI technology (e.g., as prepared by standard resorcinol-formaldehyde template methodology) generally provide a significantly lower than optimal kinetic adsorption characteristic. Accordingly, there would be a particular benefit in a porous carbon material having improved adsorption and processing kinetics as applied to CDI technology, as well as a cost-effective and reliable method for its manufacture. There would be a further benefit if such a method did not use formaldehyde, a known toxin and carcinogen.

SUMMARY OF THE INVENTION

In one aspect, the invention is directed to carbon materials possessing a hierarchical porosity, which can be, for example, a bimodal, trimodal, or higher multimodal porosity. These hierarchical porous carbon materials (i.e., "the porous carbon material") are useful for a variety of applications, particularly as capacitive deionization (CDI) electrode materials. Other possible applications include, for example, gas separation, chromatography, catalysis (e.g., as a support or active material), electrode materials (e.g., in batteries), and supercapacitors. In particular embodiments, the hierarchical porous carbon material considered herein is in the form of a film (i.e., layer).

By virtue of the presence of larger pore sizes (i.e., macropores), the hierarchical porous carbon materials described herein provide at least the significant benefit of significantly alleviating the mass-transport limitations encountered in porous carbon materials of the art. At the same time, the inclusion of smaller pores (i.e., mesopores) in these porous carbon materials maintains the effective removal of salt from water. Thus, the instant porous carbon materials can advantageously desalinate an equivalent volume of water in less time without compromising salt removal efficiency.

In particular embodiments, the hierarchical porous carbon material contains mesopores having a size in the range of 2-50 nm and macropores having a size of at least 75 nm. In further embodiments, the hierarchical porous carbon material contains mesopores having a size in the range of 2-20 nm and macropores having a size in the range of 100-500 nm. In further embodiments, the mesopores and/or macropores are substantially uniform in size. For example, in some embodiments, the mesopores have a size characterized by an error margin of up to or less than ±2.5 nm. In other particular embodiments, at least a portion of the porous carbon material is amorphous (i.e., as opposed to graphitic).

In other aspects, the invention is directed to a more cost-effective and facile method for fabricating hierarchical porous carbon materials. Methods are known in the art for producing hierarchical porous carbon materials. However, current methods are generally complex and employ a multiplicity of steps. Several of the known processes include, for example, the incorporation of sacrificial particles that are subsequently etched after curing and carbonization steps to form pores in the carbon material, as well as inclusion of secondary porogen species (for example, a glycol solvent). Furthermore, the methodology known in the art is generally not amenable to achieving batch-to-batch repeatable, precise, and ordered sets of pore sizes in the carbon material.

The method described herein is particularly advantageous in that an organic precursor composition is applied to any of a variety of substrates by simple means (e.g., spin-coating) and then carbonized to provide a hierarchical porous carbon without requiring a subsequent etching step and without requiring a secondary porogen, such as a glycol, as commonly used in methods of the art. In a preferred embodiment, the method involves subjecting a precursor composition to a curing step followed by a carbonization step, the precursor composition including: (i) a templating component that includes a block copolymer, (ii) a phenolic component, (iii) a dione component in which carbonyl groups are adjacent, and (iv) an acidic component, wherein the carbonization step includes heating the precursor composition at a carbonizing temperature for sufficient time to convert the precursor composition to a carbon material possessing a hierarchical porosity. The hierarchical porosity considered herein includes mesopores and macropores.

The method described herein for producing hierarchical porous carbon materials has overcome many of the problems encountered in the art. In particular, the method described herein can produce a hierarchical porous carbon material in fewer steps and without the use of sacrificial particles or a secondary porogen, and without the use of toxic formaldehyde. Moreover, the method described herein can achieve this simplified process without separate carbonization and pore-forming (e.g., etch) steps, i.e., the method described herein can achieve a hierarchical porous carbon material from the carbonization process step.

In yet other aspects, the invention is directed to a capacitive deionization (CDI) device, as well as methods of using the CDI device in the desalination of water. The CDI device includes at least first and second electrodes separated by a space, wherein at least one (or both, or all) of the electrodes includes the hierarchical porous carbon material described above. As further discussed below, the instant hierarchical porous carbon materials, when used in a CDI device, have been found to provide superior ion uptake kinetics.

DETAILED DESCRIPTION OF THE INVENTION

Figure 1:
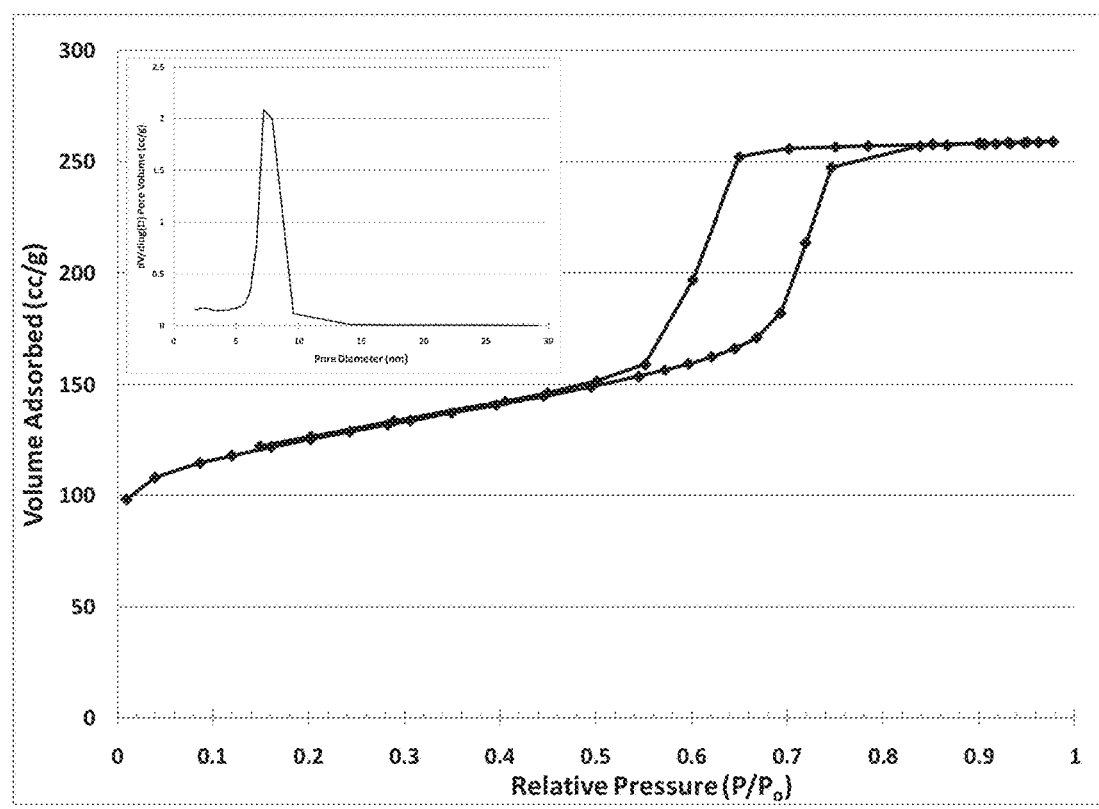
FIG. 1. Nitrogen sorption isotherms and BJH pore size distribution of hierarchical porous carbon produced from reaction of phloroglucinol and glyoxal.

In one aspect, the invention is directed to porous carbon materials possessing a hierarchical porosity that includes both mesopores and macropores. As used herein, the term "hierarchical porosity" refers to the presence of at least two different pore sizes in the porous carbon material, i.e., at least one set of pores being mesoporous and at least one set of pores being macroporous. The mesopores and macropores may be arranged, with respect to each other, in any of several different ways. For example, in some embodiments, the mesopores and macropores may be intermingled in an apparently disordered manner, i.e., without any apparent organization. In other embodiments, at least one (or both) of the mesopores and macropores are arranged in an ordered (i.e., patterned) manner, such as in a cubic or hexagonal arrangement.

As used herein and as understood in the art, the terms "mesopores" and "mesoporous" refer to pores having a size (i.e., pore diameter or pore size) of at least 2 nm and up to 50 nm, i.e., "between 2 and 50 nm", or "in the range of 2-50 nm". In different embodiments, the mesopores have a size of precisely or about 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of these values.

As used herein, the terms "macropores" and "macroporous" refer to pores having a size of at least 75 nm. Generally, the macropores considered herein have a size up to or less than 1 micron (1 μm). In different embodiments, the macropores have a size of precisely, about, at least, or greater than 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 325 nm, 350 nm, 375 nm, 400 nm, 425 nm, 450 nm, 475 nm, 500 nm, 550 nm, 600 nm, 650 nm, 700 nm, 750 nm, 800 nm, 850 nm, 900 nm, 950 nm, or 1000 nm, or a particular size, or a variation of sizes, within a range bounded by any two of these values.

As used herein, the term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. In addition, the term "about" can indicate either a measurement error (i.e., by limitations in the measurement method), or alternatively, a variation or average in a physical characteristic of a group (e.g., a population of pores).

In some embodiments, the porous carbon material possesses a microporous component. The micropores can be beneficial in providing a significantly increased surface area. The microporous component can be included in an amount of, for example, about or at least 1%, 2%, 3%, 4%, 5%, 6%, 7%, 8%, 9%, 10%, 15%, or 20%, or in an amount within a range bounded by any two of these values. As used herein, the terms "micropores" and "microporous" refer to pores having a diameter of less than 2 nm. In particular embodiments, the micropores have a size of precisely, about, up to, or less than 0.5, 0.6, 0.7, 0.8, 0.9, 1.0, 1.1, 1.2, 1.3, 1.4, 1.5, 1.6, 1.7, 1.8, or 1.9 nm, or a particular size, or a variation of sizes, within a range bounded by any two of these values.

In other embodiments, the porous carbon material possesses a substantial absence of micropores. By a "substantial absence" of micropores is generally meant that no more than 1%, 0.5%, or 0.1% of the total pore volume, or none of the pore volume, can be attributed to the presence of micropores.

The pores of the carbon material can also possess a level of uniformity, i.e., in pore size and/or pore shape. For example, in different embodiments, the pores of the carbon material may possess an average pore diameter corresponding to any of the diameters exemplified above, subject to a degree of variation of no more than, for example, ±10 nm, ±8 nm, ±6, nm, ±5 nm, ±4 nm, ±3 nm, ±2.5 nm, ±2 nm, ±1.5 nm, ±1 nm, ±0.5, ±0.4, ±0.3, ±0.2, or ±0.1 nm. Alternatively, the pore size uniformity may be indicated by being within a percentage from a target pore size, e.g., within 25%, 20%, 15%, 10%, 5%, 2% 1%, or 0.5% of a target pore size. In some embodiments, all of the pores are substantially uniform in size, while in other embodiments, a portion of the pores (e.g., the mesopores or the macropores) are substantially uniform in size.

The pores can have any suitable wall thickness. For example, in different embodiments, the wall thickness can be precisely, about, at least, or less than, for example, 1 nm, 2 nm, 3 nm, 4 nm, 5 nm, 6 nm, 7 nm, 8 nm, 9 nm, 10 nm, 11 nm, 12 nm, 15 nm, 18 nm, 20 nm, 25 nm, 30 nm, 40 nm, 50 nm, 60 nm, 70 nm, 80 nm, 90 nm, 100 nm, 125 nm, 150 nm, 175 nm, 200 nm, 250 nm, 300 nm, 350 nm, 400 nm, 450 nm, or 500 nm, or a wall thickness within a range bounded by any two of these values. The foregoing exemplary wall thicknesses can be for all pores, or for a portion of the pores, e.g., only for mesopores, macropores, or micropores.

The porous carbon material typically possesses a BET surface area of about or at least 50, 100, 200, 300, 400, 450, 500, 550, 600, 650, 700, 750, 800, 900, 1000, or 1500 m$^2$/g, or a surface area within a range bounded by any two of these values. The porous carbon material may possess a total pore volume of precisely, about, or at least, for example, 0.2 cm$^3$/g, 0.25 cm$^3$/g, 0.3 cm$^3$/g, 0.35 cm$^3$/g, 0.4 cm$^3$/g, 0.45 cm$^3$/g, 0.5 cm$^3$/g, 0.55 cm$^3$/g, 0.6 cm$^3$/g, 0.65 cm$^3$/g, 0.7 cm$^3$/g, 0.75 cm$^3$/g, 0.8 cm$^3$/g, 0.9 cm$^3$/g, 1 cm$^3$/g, 1.1 cm$^3$/g, 1.2 cm$^3$/g, 1.3 cm$^3$/g, 1.4 cm$^3$/g, 1.5 cm$^3$/g, 1.6 cm$^3$/g, 1.7 cm$^3$/g, 1.8 cm$^3$/g, 1.9 cm$^3$/g, 2 cm$^3$/g, 2.1 cm$^3$/g, 2.2 cm$^3$/g, 2.3 cm$^3$/g, 2.4 cm$^3$/g, 2.5 cm$^3$/g, 2.6 cm$^3$/g, 2.7 cm$^3$/g, 2.8 cm$^3$/g, 2.9 cm$^3$/g, or 3.0 cm$^3$/g, or a pore volume within a range bounded by any two of these values.

Preferably, at least a portion of the porous carbon material is amorphous rather than graphitic. Generally, an amorphous portion of the carbon material includes micropores, whereas micropores are generally absent from graphitic portions. As discussed above, the presence of micropores can provide certain advantages. In different embodiments, precisely, about, or at least 20%, 30%, 40%, 50%, 60%, 70%, 80%, 85%, or 90% of the porous carbon material is amorphous, wherein it is understood that the remaining portion of the carbon material is graphitic or another phase of carbon (e.g., glassy or vitreous carbon). In particular embodiments, the porous carbon material is no more than, or less than, 25%, 20%, 15%, 10%, 5%, 2%, or 1% graphitic. In some embodiments, all (e.g., about or precisely 100%) or substantially all (for example, greater than 90%, 95%, 98%, or 99%) of the porous carbon material is non-graphitic, and may be instead, for example, amorphous or glassy carbon.

The porous carbon material can be in any suitable form, e.g., as rods, cubes, or sheets, depending on the application. In particular embodiments, the porous carbon material is in the form of a film. The film can have any suitable thickness, typically no more than 5 millimeters (5 mm). In different embodiments, the film may preferably have a thickness of precisely, about, up to, at least, or less than, for example, 5 nm, 10 nm, 20 nm, 30 nm, 40 nm, 50 nm, 100 nm, 200 nm, 300 nm, 400 nm, 500 nm, 600 nm, 700 nm, 800 nm, 900 nm, 1.0 µm, 1.2 µm, 1.5 µm, 2.0 µm, 2.5 µn, 3.0 µm, 4.0 µm, 5.0 µm, 10 µm, 20 µm, 30 µm, 40 µm, 60 µm, 70 µm, 80 µm, 90 µm, 100 µm, 150 µm, 200 µm, 250 µm, 300 µm, 350 µm, 400 µm, 450 µm, 500 µm, 600 µm, 700 µm, 800 µm, 900 µm, or 1000 µm, or a thickness within a range bounded by any two of these values.

The porous carbon film may also function as part of a composite material, wherein the porous carbon film either overlays, underlies, or is sandwiched between one or more layers of another material. The other material may be porous or non-porous, and can be composed of, for example, a metal, metal alloy, ceramic (e.g., silica, alumina, or a metal oxide), organic or inorganic polymer, or composite or hybrid thereof, depending on the application. In particular embodiments, the porous carbon film functions as a coating on an electrically-conducting substrate suitable as an electrode. In further particular embodiments, the electrically-conducting substrate is, or includes, a carbon material, such as graphite. In other embodiments, the porous carbon film is monolithic (i.e., not disposed on a substrate).

In another embodiment, the porous carbon material is in the form of particles. In different embodiments, the particles have a size precisely, about, up to, or less than, for example, 5 nm, 10 nm, 20 nm, 30 nm, 40 nm, 50 nm, 100 nm, 200 nm, 500 nm, 1 µm, 2 µm, 5 µm, 10 µm, 50 µm, 100 µm, 500 µm, or 1000 µm, or a size within a range bounded by any two of these values.

In another aspect, the invention is directed to methods for fabricating a hierarchical porous carbon material, such as any of the hierarchical porous carbon materials described above. The method first involves providing (i.e., preparing or otherwise obtaining in prepared form) a precursor composition to be subjected to a curing step followed by a carbonization step in order to produce a porous carbon material of the invention. The precursor composition includes at least the following components: (i) a templating component that contains (or includes) a block copolymer, (ii) a phenolic component (i.e., one or more phenolic compounds), (iii) a dione component (i.e., one or more dione compounds) in which carbonyl groups are adjacent, and (iv) an acidic component. In some embodiments, the precursor composition contains only the foregoing four components (i.e., any other compound or material not within the scope of the foregoing components is excluded).

The combination of phenolic component and dione component is herein referred to as the "polymer precursor" or "polymer precursor components". These two components, when properly reacted and cured (as further discussed below), produce a polymer that is subsequently carbonized during a carbonization step. Hence, the polymer functions as a carbon precursor. In contrast, the templating component (i.e., block copolymer) functions to organize the polymer precursor materials in an ordered (i.e., patterned) arrangement before the carbonization step. During carbonization, the block copolymer is typically completely volatized into gaseous byproducts, and thereby, generally does not contribute to the carbon content. However, the volatile gases serve the important role of creating at least the mesopores in the carbon structure during the carbonization step. The mechanism by which the hierarchical porous structure, including macropores, is produced, is not currently understood in much detail. It is believed that, while the block copolymer is largely responsible for producing mesopores, the phenolic compound, dione compound, or combination thereof (or combination of any of these compounds with the block copolymer) is responsible for the hierarchical porosity.

The templating component includes one or more block copolymers. The block copolymer preferably has the ability to establish selective interactions with the polymer precursor components in such a manner that an organized network of interactions between the block copolymer and polymer precursor components results. Typically, such selective interactions occur when at least two different segments of the block copolymer differ in hydrophobicity (or hydrophilicity). Generally, a block copolymer that can self-organize based on hydrophobic or other variations will be suitable as a templating component herein. Such block copolymers typically form periodic structures by virtue of selective interactions between like domains, i.e., between hydrophobic domains and between hydrophilic domains. In some embodiments, the templating component includes only one or more block copolymers, i.e., excludes other compounds and materials that are not block copolymers. In some embodiments, the block copolymer includes one or more ionic groups. In other embodiments, the block copolymer is non-ionic.

As used herein, a "block copolymer" is a polymer containing two or more chemically distinct polymeric blocks (i.e., sections or segments). The copolymer can be, for example, a diblock copolymer (e.g., A-B), triblock copolymer (e.g., A-B-C), tetrablock copolymer (e.g., A-B-C-D), or higher block copolymer, wherein A, B, C, and D represent chemically distinct polymeric segments. The block copolymer is preferably not completely inorganic, and more preferably, completely organic (i.e., carbon-based) in order that the block copolymer is at least partially capable of volatilizing during the carbonization step. The block copolymer is typically linear; however, branched (e.g., glycerol branching units) and grafted block copolymer variations are also contemplated herein. Preferably, the block copolymer contains polar groups capable of interacting (e.g., by hydrogen or ionic bonding) with the phenolic component and/or dione component. Some of the groups preferably located in the block copolymer that can provide a favorable interactive bond with phenolic and/or carbonyl groups include, for example, ether, hydroxy, amino, imino, and carbonyl groups. For this reason, the block copolymer is preferably not a complete hydrocarbon such as styrene-butadiene, although it may be desirable in some situations to include a generally hydrophobic polymer or block copolymer with a polar interactive block copolymer to suitably modify or enhance the organizing or patterning characteristics and ability of the polar block copolymer. For analogous reasons, a generally hydrophilic polymer (e.g., a polyalkylene oxide, such as polyethylene oxide or polypropylene oxide) or generally hydrophilic block copolymer may be included with the polar interactive block copolymer. In other embodiments, such generally hydrophobic or hydrophilic polymers or copolymers are excluded.

Some examples of classes of block copolymers suitable as templating agents include those containing segments of polyacrylate or polymethacrylate (and esters thereof), polystyrene, polyethyleneoxide, polypropyleneoxide, polyethylene, polyacrylonitrile, polylactide, and polycaprolactone. Some specific examples of templating block copolymers include polystyrene-b-poly(methylmethacrylate) (i.e., PS-PMMA), polystyrene-b-poly(acrylic acid) (i.e., PS-PAA), polystyrene-b-poly(4-vinylpyridine) (i.e., PS-P4VP), polystyrene-b-poly(2-vinylpyridine) (i.e., PS-P2VP), polyethylene-b-poly(4-vinylpyridine) (i.e., PE-P4VP), polystyrene-b-polyethyleneoxide (i.e., PS-PEO), polystyrene-b-poly(4-hydroxystyrene), polyethyleneoxide-b-polypropyleneoxide (i.e., PEO-PPO), polyethyleneoxide-b-poly(4-vinylpyridine) (i.e., PEO-P4VP), polyethylene-b-polyethyleneoxide (i.e., PE-PEO), polystyrene-b-poly(D,L-lactide), polystyrene-b-poly(methylmethacrylate)-b-polyethyleneoxide (i.e., PS-PMMA-PEO), polystyrene-b-polyacrylamide, polystyrene-b-polydimethylacrylamide (i.e., PS-PDMA), polystyrene-b-polyacrylonitrile (i.e., PS-PAN), and polyethyleneoxide-b-polyacrylonitrile (i.e., PEO-PAN). In some embodiments, one or more of any of the foregoing classes or specific types of copolymers are excluded.

In particular embodiments, the block copolymer is a diblock or triblock copolymer containing two or three segments, respectively, which have alkyleneoxide compositions, particularly wherein the alkyleneoxide is selected from polyethyleneoxide (PEO) and polypropyleneoxide (PPO) segments. In more particular embodiments, the block copolymer is an alkyleneoxide triblock copolymer, such as a poloxamer (i.e. Pluronic® or Lutrol® polymer) according to the general formula $(PEO)_a$-$(PPO)_b$-$(PEO)_c$, wherein PEO is a polyethylene oxide block and PPO is a polypropylene block (i.e., —$CH_2CH(CH_3)O$— or —$CH(CH_3)CH_2O$—), and the subscripts a, b, and c represent the number of monomer units of PEO and PPO, as indicated. Typically, a, b, and c are each at least 2, and more typically, at least 5, and typically up to a value of 100, 120, or 130. Subscripts a and c are often of equal value in these types of polymers. In different embodiments, a, b, and c can independently have a value of about, or at least, or up to 10, 20, 30, 40, 50, 60, 70, 80, 90, 100, 120, 130, 140, 150, 160, 180, 200, 220, 240, or any particular range established by any two of these exemplary values.

In one embodiment, a and c subscripts are each less than b, i.e., the hydrophilic PEO block is shorter on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each less than b. Furthermore, in different embodiments, it can be preferred for the a and c values to be less than b by a certain number of units, e.g., by 2, 5, 7, 10, 12, 15, 20, 25, 30, 35, 40, 45, or 50 units, or any range therein. Alternatively, it can be preferred for the a and c values to be a certain fraction or percentage of b (or less than or greater than this fraction or percentage), e.g., about 10%, 20%, 25%, 30, 33%, 40%, 50%, 60%, 70%, 75%, 80%, 85%, 90%, or any range delimited by any two of these values.

In another embodiment, a and c subscripts are each greater than b, i.e., the hydrophilic PEO block is longer on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each greater than b. Furthermore, in different embodiments, it can be preferred for the a and c values to be greater than b by a certain number of units, e.g., by 2, 5, 7, 10, 12, 15, 20, 25, 30, 35, 40, 45, or 50 units, or any range therein. Alternatively, it can be preferred for the b value to be a certain fraction or percentage of a and c values (or less than or greater than this fraction or percentage), e.g., about 10%, 20%, 25%, 30, 33%, 40%, 50%, 60%, 70%, 75%, 80%, 85%, 90%, or any range delimited by any two of these values.

In different embodiments, the poloxamer preferably has a minimum average molecular weight of at least 500, 800, 1000, 1200, 1500, 2000, 2500, 3000, 3500, 4000, or 4500 g/mole, and a maximum average molecular weight of 5000, 5500, 6000, 6500, 7000, 7500, 8000, 8500, 9000, 9500, 10,000, 12,000, 15,000, or 20,000 g/mole, wherein a particular range can be established between any two of the foregoing values, and particularly, between any two the minimum and maximum values. The viscosity of the polymers is generally at least 200, 250, 300, 350, 400, 450, 500, 550, 600, or 650 centipoise (cps), and generally up to 700, 800, 900, 1000, 1500, 2000, 2500, 3000, 3500, 4000, 4500, 5000, 5500, 6000, 6500, 7000, or 7500 cps, or any particular range established between any two of the foregoing values.

The following table lists several exemplary poloxamer polymers applicable to the present invention.

TABLE 1

Some exemplary poloxamer polymers

| Generic Name | Pluronic® Name | Approximate value of a | Approximate value of b | Approximate value of c |
|---|---|---|---|---|
| Poloxamer 101 | Pluronic L-31 | 2 | 16 | 2 |
| Poloxamer 105 | Pluronic L-35 | 11 | 16 | 11 |
| Poloxamer 108 | Pluronic F-38 | 46 | 16 | 46 |
| Poloxamer 122 | — | 5 | 21 | 5 |
| Poloxamer 123 | Pluronic L-43 | 7 | 21 | 7 |
| Poloxamer 124 | Pluronic L-44 | 11 | 21 | 11 |
| Poloxamer 181 | Pluronic L-61 | 3 | 30 | 3 |
| Poloxamer 182 | Pluronic L-62 | 8 | 30 | 8 |
| Poloxamer 183 | — | 10 | 30 | 10 |
| Poloxamer 184 | Pluronic L-64 | 13 | 30 | 13 |
| Poloxamer 185 | Pluronic P-65 | 19 | 30 | 19 |
| Poloxamer 188 | Pluronic F-68 | 75 | 30 | 75 |
| Poloxamer 212 | — | 8 | 35 | 8 |
| Poloxamer 215 | — | 24 | 35 | 24 |

TABLE 1-continued

Some exemplary poloxamer polymers

| Generic Name | Pluronic ® Name | Approximate value of a | Approximate value of b | Approximate value of c |
|---|---|---|---|---|
| Poloxamer 217 | Pluronic F-77 | 52 | 35 | 52 |
| Poloxamer 231 | Pluronic L-81 | 6 | 39 | 6 |
| Poloxamer 234 | Pluronic P-84 | 22 | 39 | 22 |
| Poloxamer 235 | Pluronic P-85 | 27 | 39 | 27 |
| Poloxamer 237 | Pluronic F-87 | 62 | 39 | 62 |
| Poloxamer 238 | Pluronic F-88 | 97 | 39 | 97 |
| Poloxamer 282 | Pluronic L-92 | 10 | 47 | 10 |
| Poloxamer 284 | — | 21 | 47 | 21 |
| Poloxamer 288 | Pluronic F-98 | 122 | 47 | 122 |
| Poloxamer 331 | Pluronic L-101 | 7 | 54 | 7 |
| Poloxamer 333 | Pluronic P-103 | 20 | 54 | 20 |
| Poloxamer 334 | Pluronic P-104 | 31 | 54 | 31 |
| Poloxamer 335 | Pluronic P-105 | 38 | 54 | 38 |
| Poloxamer 338 | Pluronic F-108 | 128 | 54 | 128 |
| Poloxamer 401 | Pluronic L-121 | 6 | 67 | 6 |
| Poloxamer 403 | Pluronic P-123 | 21 | 67 | 21 |
| Poloxamer 407 | Pluronic F-127 | 98 | 67 | 98 |

As known in the art, the names of the poloxamers and Pluronics (as given above) contain numbers that provide information on the chemical composition. For example, the generic poloxamer name contains three digits, wherein the first two digits×100 indicates the approximate molecular weight of the PPO portion and the last digit×10 indicates the weight percent of the PEO portion. Accordingly, poloxamer 338 possesses a PPO portion of about 3300 g/mole molecular weight, and 80 wt % PEO. In the Pluronic name, the letter indicates the physical form of the product, i.e., L=liquid, P=paste, and F=solid, i.e., flake. The first digit, or two digits for a three-digit number, multiplied by 300, indicates the approximate molecular weight of the PPO portion, while the last digit×10 indicates the weight percent of the PEO portion. For example, Pluronic® F-108 (which corresponds to poloxamer 338) indicates a solid form composed of about 3,000 g/mol of the PPO portion and 80 wt % PEO.

Numerous other types of copolymers containing PEO and PPO blocks are possible, all of which are applicable herein. For example, the block copolymer can also be a reverse poloxamer of general formula $(PPO)_a\text{-}(PEO)_b\text{-}(PPO)_c$, wherein all of the details considered above with respect to the regular poloxamers (e.g., description of a, b, and c subscripts, and all of the other exemplary structural possibilities) are applicable by reference herein for the reverse poloxamers.

In another variation, the block copolymer contains a linking diamine group (e.g., ethylenediamine, i.e., EDA) or triamine group (e.g., melamine). Some examples of such copolymers include the Tetronics® (e.g., PEO-PPO-EDA-PPO-PEO) and reverse Tetronics® (e.g., PPO-PEO-EDA-PEO-PPO).

The phenolic component is or includes any phenolic compound that can react by a condensation reaction with a carbonyl-containing compound (and more particularly, a dione compound, as described herein) under acidic conditions. Typically, any compound that includes at least one hydroxy group bound to an aromatic ring (typically, a phenyl ring) is suitable for the present invention as a phenolic compound. In some embodiments, the phenolic component includes only one or more phenolic compounds, i.e., excludes other compounds and materials that are not phenolic.

In one embodiment, the phenolic compound contains one phenolic hydroxy group (i.e., one hydroxy group bound to a six-membered aromatic ring). Some examples of such compounds include phenol, the halophenols, the aminophenols, the hydrocarbyl-substituted phenols (wherein "hydrocarbyl" includes, e.g., straight-chained, branched, or cyclic alkyl, alkenyl, or alkynyl groups typically containing from 1 to 6 carbon atoms, optionally substituted with one or more oxygen or nitrogen atoms), hydrocarbyl-unsubstituted phenols, naphthols (e.g., 1- or 2-naphthol), nitrophenols, hydroxyanisoles, hydroxybenzoic acids, fatty acid ester-substituted or polyalkyleneoxy-substituted phenols (e.g., on the 2 or 4 positions with respect to the hydroxy group), phenols containing an azo linkage (e.g., p-hydroxyazobenzene), and phenolsulfonic acids (e.g., p-phenolsulfonic acid). Some general subclasses of halophenols include the fluorophenols, chlorophenols, bromophenols, and iodophenols, and their further sub-classification as, for example, p-halophenols (e.g., 4-fluorophenol, 4-chlorophenol, 4-bromophenol, and 4-iodophenol), m-halophenols (e.g., 3-fluorophenol, 3-chlorophenol, 3-bromophenol, and 3-iodophenol), o-halophenols (e.g., 2-fluorophenol, 2-chlorophenol, 2-bromophenol, and 2-iodophenol), dihalophenols (e.g., 3,5-dichlorophenol and 3,5-dibromophenol), and trihalophenols (e.g., 3,4,5-trichlorophenol, 3,4,5-tribromophenol, 3,4,5-trifluorophenol, 3,5,6-trichlorophenol, and 2,3,5-tribromophenol). Some examples of aminophenols include 2-, 3-, and 4-aminophenol, and 3,5- and 2,5-diaminophenol. Some examples of nitrophenols include 2-, 3-, and 4-nitrophenol, and 2,5- and 3,5-dinitrophenol. Some examples of hydrocarbyl-substituted phenols include the cresols, i.e., methylphenols or hydroxytoluenes (e.g., o-cresol, m-cresol, p-cresol), the xylenols (e.g., 3,5-, 2,5-, 2,3-, and 3,4-dimethylphenol), the ethylphenols (e.g., 2-, 3-, and 4-ethylphenol, and 3,5- and 2,5-diethylphenol), n-propylphenols (e.g., 4-n-propylphenol), isopropylphenols (e.g., 4-isopropylphenol), butylphenols (e.g., 4-n-butylphenol, 4-isobutylphenol, 4-t-butylphenol, 3,5-di-t-butylphenol, 2,5-di-t-butylphenol), hexylphenols, octyl phenols (e.g., 4-n-octylphenol), nonylphenols (e.g., 4-n-nonylphenol), phenylphenols (e.g., 2-phenylphenol, 3-phenylphenol, and 4-phenylphenol), and hydroxycinnamic acid (p-coumaric acid). Some examples of hydroxyanisoles include 2-methoxyphenol, 3-methoxyphenol, 4-methoxyphenol, 3-t-butyl-4-hydroxyanisole (e.g., BHA), and ferulic acid. Some examples of hydroxybenzoic acids include 2-hydroxybenzoic acid (salicylic acid), 3-hydroxybenzoic acid, 4-hydroxybenzoic acid, and their organic acid esters (e.g., methyl salicylate and ethyl-4-hydroxybenzoate).

In another embodiment, the phenolic compound contains two phenolic hydroxy groups. Some examples of such compounds include catechol, resorcinol, hydroquinone, the hydrocarbyl-linked bis-phenols (e.g., bis-phenol A, methylenebisphenol, and 4,4'-dihydroxystilbene), 4,4'-biphenyl, the halo-substituted diphenols (e.g., 2-haloresorcinols, 3-haloresorcinols, and 4-haloresorcinols, wherein the halo group can be fluoro, chloro, bromo, or iodo), the amino-substituted diphenols (e.g., 2-aminoresorcinol, 3-aminoresorcinol, and 4-aminoresorcinol), the hydrocarbyl-substituted diphenols (e.g., 2,6-dihydroxytoluene, i.e., 2-methylresorcinol; 2,3-, 2,4-, 2,5-, and 3,5-dihydroxytoluene, 1-ethyl-2,6-dihydroxybenzene, caffeic acid, and chlorogenic acid), the nitro-substituted diphenols (e.g., 2- and 4-nitroresorcinol), dihydroxyanisoles (e.g., 3,5-, 2,3-, 2,5-, and 2,6-dihydroxyanisole, and vanillin), dihydroxybenzoic acids (e.g., 3,5-, 2,3-, 2,5-, and 2,6-dihydroxybenzoic acid, and their alkyl esters, and vanillic acid), and phenolphthalein.

In another embodiment, the phenolic compound contains three phenolic hydroxy groups. Some examples of such compounds include phloroglucinol (1,3,5-trihydroxybenzene), pyrogallol (1,2,3-trihydroxybenzene), 1,2,4-trihydroxybenzene, 5-chloro-1,2,4-trihydroxybenzene, resveratrol (trans-3,5,4'-trihydroxystilbene), the hydrocarbyl-substituted triphenols (e.g., 2,4,6-trihydroxytoluene, i.e., methylphloroglucinol, and 3,4,5-trihydroxytoluene), the halogen-substituted triphenols (e.g., 5-chloro-1,2,4-trihydroxybenzene), the carboxy-substituted triphenols (e.g., 3,4,5-trihydroxybenzoic acid, i.e., gallic acid or quinic acid, and 2,4,6-trihydroxybenzoic acid), the nitro-substituted triphenols (e.g., 2,4,6-trihydroxynitrobenzene), and phenol-formaldehyde resoles or novolak resins containing three phenol hydroxy groups.

In yet another embodiment, the phenolic compound or material contains multiple (i.e., greater than three) phenolic hydroxy groups. Some examples of such compounds include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups), quercetin, ellagic acid, and tetraphenol ethane.

In some embodiments, one, two, or more of any of the classes or specific types of phenolic compounds described above are excluded from the phenolic component. In particular embodiments, the phenolic compound is monocyclic (i.e., contains a phenyl ring not fused or connected to another ring) and contains two or three phenolic hydroxy groups. For example, in some embodiments, the phenolic component is, or includes, resorcinol and/or phloroglucinol (i.e., 1,3,5-trihydroxybenzene).

The dione component includes one or more compounds containing carbonyl groups that are adjacent. The carbonyl groups can be, for example, keto and/or aldehydic groups. By being "adjacent" is meant that the two carbonyl groups are in close enough proximity to be jointly engaged in a single hydrogen bonding interaction (e.g., a hydrogen atom engaging both carbonyl group oxygens), or similarly, close enough to be involved in a tautomeric interaction, as understood in the art and as described in further detail below. Generally, for purposes of the invention, carbonyl groups are considered adjacent if they are vicinal (i.e., are connected by a bond between carbonyl carbon atoms) or if they are attached to the same or adjacent (i.e., 1,2 or ortho) ring carbon atoms in a cyclic structure, particularly an aromatic cyclic, bicyclic, or higher polycyclic structure.

In a first set of embodiments, the dione component includes one or more vicinal dione compounds. In particular embodiments, the vicinal dione compound has the following chemical structure:

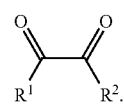

In formula (1), $R^1$ and $R^2$ are independently selected from hydrogen atom and hydrocarbon groups. In particular embodiments, the hydrocarbon groups considered herein contain precisely, at least, or up to one, two, three, four, five, or six carbon atoms. In some embodiments, the hydrocarbon groups contain only carbon and hydrogen atoms. In other embodiments, the hydrocarbon groups may further include one or more oxygen atoms inserted between carbon atoms, or can have one or more hydrogen atoms substituted with one or more heteroatom-containing groups, such as hydroxy, halogen atom (e.g., F, Cl, or Br), ether (e.g., methoxy, ethoxy, epoxide, and/or glycidyl), carboxylic acid, carboxylic ester, and/or amido groups. In some embodiments, one or both hydrocarbon groups are saturated. The saturated hydrocarbon groups can be straight-chained (e.g., methyl, ethyl, n-propyl, n-butyl, n-pentyl, and n-hexyl), or branched (e.g., isopropyl, isobutyl, sec-butyl, t-butyl, isopentyl, and neopentyl), or cyclic (e.g., cyclopropyl, cyclobutyl, cyclopentyl, and cyclohexyl). In other embodiments, one or both hydrocarbon groups are unsaturated. The unsaturated hydrocarbon groups can be straight-chained (e.g., vinyl or allyl), or branched (e.g., 2-methylallyl), or cyclic (e.g., cyclopentenyl, cyclopentadienyl, cyclohexenyl, and phenyl).

In some embodiments of Formula (1), $R^1$ and $R^2$ are hydrogen atoms, thus corresponding to glyoxal, i.e., HC(O)C(O)H (i.e., 1,2-ethandial). In other embodiments of Formula (1), one of $R^1$ and $R^2$ is a hydrogen atom while another of $R^1$ and $R^2$ is a hydrocarbon group, thus corresponding to vicinal aldehyde-ketone compounds. Some examples of vicinal aldehyde-ketone compounds include 2-oxopropanal (i.e., methylglyoxal, also known as pyruvaldehyde), 2-oxobutanal (i.e., ethylglyoxal), 2-oxopentanal (i.e., n-propylglyoxal), 2-oxohexanal, 3-methyl-2-oxobutanal (i.e., isopropylglyoxal), 3-methyl-2-oxopentanal, 4-methyl-2-oxopentanal (i.e., isobutylglyoxal), 2-oxobut-3-enal, and 2-cyclopropyl-2-oxoacetaldehyde. In yet other embodiments of Formula (1), $R^1$ and $R^2$ are both hydrocarbon groups, thus corresponding to vicinal diketone compounds. In the vicinal diketone compounds, $R^1$ and $R^2$ can be independently selected from any of the types of hydrocarbon groups described above. Some examples of vicinal ketone compounds include 2,3-butadione (i.e., diacetyl), 2,3-pentanedione (i.e., ethylmethylglyoxal), 2,3-hexanedione (i.e., methylpropylglyoxal), 3,4-hexanedione (i.e., diethylglyoxal), 2,3-heptanedione, 3,4-heptanedione, 2,3-octanedione, 3,4-octanedione, 4,5-octanedione (dipropylglyoxal), pent-4-ene-2,3-dione, and hexa-1,5-diene-3,4-dione.

In some embodiments, $R^1$ and $R^2$ in Formula (1) are not interconnected. In other embodiments, $R^1$ and $R^2$ are interconnected as a cyclic structure. Typically, the $R^1$-$R^2$ interconnection contains precisely or at least three or four ring carbon atoms. The ring carbon atoms in the $R^1$-$R^2$ interconnection may or may not also have one or more hydrogen atoms therein substituted by one or more hydrocarbon groups, typically alky groups containing one, two, or three carbon atoms. Some examples of dione compounds wherein $R^1$ and $R^2$ in Formula (1) are interconnected include cyclopentane-1,2-dione, 3,5-dimethylcyclopentane-1,2-dione, 3,4,4-trimethylcyclopentane-1,2-dione, cyclohexane-1,2-dione, cycloheptane-1,2-dione, cyclohex-4-ene-1,2-dione, and cyclohexa-3,5-diene-1,2-dione.

In a second set of embodiments, the dione component has two carbonyl groups attached to adjacent (i.e., 1,2 or ortho) ring carbon atoms in a cyclic structure. In particular embodiments, such a dione compound has the following chemical structure:

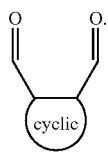
(2)

In Formula (2), the cyclic group represents a saturated or unsaturated monocyclic, bicyclic, or tricyclic group. The cyclic group can be saturated or unsaturated. The cyclic group may alternatively be aliphatic or aromatic. As defined herein, a monocyclic group includes a single ring not fused or bonded to another ring. A bicyclic group contains two rings either fused or connected by a bond. A tricyclic group contains three rings either fused or connected by bonds. Typically, the monocyclic group contains precisely or at least four, five, or six ring carbon atoms. Bicyclic groups may contain precisely or at least, for example, eight, nine, or ten ring carbon atoms. Tricyclic groups may contain precisely or at least, for example, thirteen or fourteen ring carbon atoms. In some embodiments, the cyclic group contains only carbon and hydrogen atoms (i.e., is carbocyclic). In other embodiments, the cyclic group includes one or more ring heteroatoms selected from oxygen, nitrogen, and sulfur (i.e., is heterocyclic). The cyclic group may or may not also have one or more hydrogen atoms substituted with one or more hydrocarbon groups (e.g., alkyl groups of one to three carbon atoms) and/or one or more heteroatom-containing groups (e.g., selected from hydroxy, methoxy, ethoxy, amino, carboxamido, keto, and aldehyde groups).

Some examples of saturated monocyclic groups in Formula (2) include cyclopentylene and cyclohexylene groups, thereby resulting in cyclopentane-1,2-dicarboxaldehyde and cyclohexane-1,2-dicarboxaldehyde, respectively, for the structure in Formula (2). Some examples of unsaturated monocyclic groups include phenylene, cyclopentadienyl (e.g., 2,3-diyl), and furan-2,5-diyl, thereby resulting in 1,2-benzenedialdehyde (i.e., phthalaldehyde), cyclopenta-1,3-diene-2,3-dicarboxaldehyde, and furan-2,5-dicarboxaldehyde, respectively, for the structure in Formula (2). Some examples of bicyclic and tricyclic groups include naphthalenyl (e.g., 2,3-diyl) and anthracenyl (e.g., 2,3-diyl), thereby resulting in, for example, naphthalene-2,3-dicarboxaldehyde and anthracene-2,3-dicarboxaldehyde, respectively, for the structure in Formula (2).

In Formulas (1) and (2), the close proximity of the carbonyl groups permits the carbonyl groups to engage in a simultaneous hydrogen bonding interaction with protic species (in particular, phenol groups) present in the precursor composition. More particularly, the close proximity of the carbonyl groups is believed to form a hydrogen-bonded enolic intermediate after one of the carbonyl groups is electrophilically attacked by an active phenol carbon. The foregoing concept is depicted as follows, with phloroglucinol and glyoxal as exemplary phenolic and dione compounds (wherein the hydrogen bond is indicated by a dashed bond):

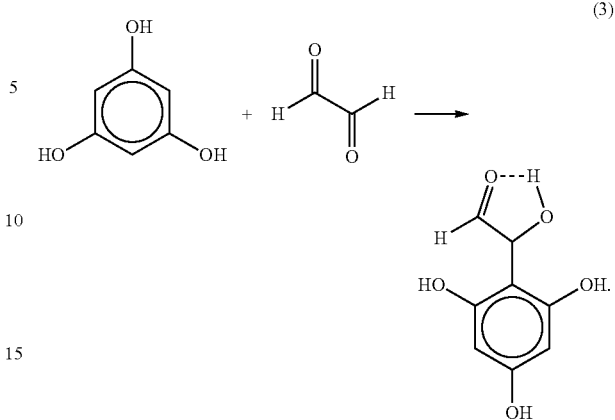
(3)

Without being bound by any theory, it is believed that formation of this hydrogen bond causes a moderation in reactivity of the remaining carbonyl group. This moderating effect is believed to be at least partly responsible for the hierarchical porous feature of the carbon materials produced herein. In particular, by forming the hydrogen bond, it is believed that the reactivity of at least the second aldehyde group (i.e., the one not connected to the phenol group) is muted, thus affecting its reactivity. This effect could result in, or promote, a hierarchical structure by affecting how the phenolic groups interlink. The muted reactivity could, for example, inhibit or prohibit the formation of a bond to the second aldehyde or provide a reactive site after the first round of reactions, i.e., result in a delayed reaction. The delayed reaction could constrain the carbon polymer such that during annealing the constrained bridges are broken, and the unbound or broken groups liberated as a volatile gas. By an alternative theory, both sides react, although delayed, to produce a constrained structure, which, upon carbonization, liberates gaseous products that result in a hierarchical structure.

In some embodiments, a dione compound that is not encompassed by Formula (1) is excluded from the dione component, or from the precursor composition altogether. In other embodiments, a dione compound that is not encompassed by Formula (2) is excluded from the dione component, or from the precursor composition altogether. In yet other embodiments, a dione compound that is not encompassed by Formula (1) or (2) is excluded from the dione component, or from the precursor composition altogether. Some examples of dione compounds that may be excluded (and which are not encompassed by Formulas (1) and (2)) include, for example, malondialdehyde, succinaldehyde, glutaraldehyde, adipaldehyde, pimelaldehyde, suberaldehyde, sebacaldehyde, and terephthaldehyde. In still other embodiments, one or more subclasses or specific types of dione compounds, either from Formula (1) or (2) may be excluded from the dione component, or from the precursor composition altogether. In yet other embodiments, a mono-aldehyde or mono-ketone, such as formaldehyde, acetaldehyde, acetone, or furfural, is excluded from the precursor composition.

The acidic component in the precursor composition can be any acid strong enough to accelerate the reaction between phenolic and dione compounds. In some embodiments, the acid is a weak acid, such as an organic acid, such as acetic acid, propionic acid, or phosphoric acid. In other embodiments, the acid is a strong acid, such as a mineral acid, such as hydrochloric acid, hydrobromic acid, hydroiodic acid, sulfuric acid, or a superacid, such as triflic acid. Depending on the type of acid and other conditions, the molar concentration of acid (per total precursor composition) can be, for example, at least 0.5 molar (i.e., 0.5 M), 0.6 M, 0.7 M, 0.8 M, 1.0 M, 1.2 M, 1.5 M, 1.8 M, 2.0 M, 2.5 M, 3.0 M, 3.5 M, 4.0 M, 4.5 M, 5.0M, or an acid concentration within a range bounded by any two of the foregoing values. The molar concentration values given may also be referred to in terms of molar equivalents of $H^+$, or pH, wherein the pH for a strong acid generally abides by the formula pH=$-\log [H^+]$, wherein $[H^+]$ represents the concentration of $H^+$ ions.

In some embodiments, the molar amount of dione component is higher than the molar amount of phenolic component (i.e., molar ratio of dione to phenolic components is greater than 1). In such embodiments, the molar ratio of dione to phenolic components may be precisely, about, or at least, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range bounded by any two of these values. In other embodiments, the molar amount of dione component is less than the molar amount of phenolic component (i.e., molar ratio of dione to phenolic components is less than 1). In such embodiments, the molar ratio of dione to phenolic components may be precisely, about, or less than, for example, 0.9, 0.8, 0.7, 0.6, 0.5, 0.4, 0.3, or 0.2, or within a range bounded by any two of these values. In other embodiments, the molar amount of dione component is about the same as the molar amount of phenolic component.

Any one or more of the above components may or may not be dissolved in a suitable solvent. The solvent can be, for example, an organic polar protic or non-protic solvent. Some examples of organic polar protic solvents include alcohols, e.g., methanol, ethanol, n-propanol, isopropanol, ethylene glycol, and the like. Some examples of organic polar non-protic solvents include acetonitrile, dimethylformamide, dimethylsulfoxide, methylene chloride, organoethers (e.g., tetrahydrofuran or diethylether), and the like. In some embodiments, any solvent, or any of the classes or particular types of solvents described above (except for water), may be excluded from the precursor composition.

In some embodiments, an orthoacetate, e.g., triethyl orthoacetate, is excluded from the precursor composition. In other embodiments, a weak acid (i.e., having a pKa above −2), and particularly, the weak organic acids (e.g., p-toluenesulfonic acid or hypophosphorous acid), are excluded from the precursor composition. In yet other embodiments, a phenol-formaldehyde resole or novolak resin (e.g., those of 500-5000 M.W.) is excluded from the precursor composition.

In some embodiments, all of the precursor components, described above, are combined and mixed to form the precursor composition. The precursor composition can then be deposited by any suitable means known in the art to produce a film (i.e., coating) of the precursor composition on a substrate. Some examples of solution deposition processes include spin-coating, brush coating (painting), spraying, and dipping. After being deposited, the precursor film is subsequently cured and then carbonized.

In other embodiments, a multi-step process is employed in which a portion of the precursor components is first deposited to produce an initial film, and the initial film subsequently reacted by the remaining component(s) of the precursor composition. After all components have reacted to produce a precursor film, the precursor film is cured and then carbonized. Additional steps may also be included. For example, a multi-step process may be employed wherein the templating component in combination with the phenolic component is first deposited by, for example, applying (i.e., coating) said components onto a surface. If desired, the initially produced film can be converted to a solid film by removing solvent therefrom (e.g., by annealing). The produced film may then be reacted with the dione component (e.g., by a liquid or vapor phase reaction) under acidic conditions to produce the polymerized (and optionally, crosslinked) carbon precursor material. The resulting cured film can then be carbonized to produce the mesoporous carbon material.

The curing step includes any of the conditions, as known in the art, which promote polymerization, and preferably, crosslinking, of polymer precursors, and in particular, crosslinking between phenolic and aldehydic or dione components. The curing conditions generally include application of an elevated temperature for a specified period of time. However, other curing conditions and methods are contemplated herein, including radiative (e.g., UV curing) or purely chemical (i.e., without use of an elevated temperature). In particular embodiments, the curing step involves subjecting the polymer precursors or the entire precursor composition to a temperature of precisely, at least, or about, for example, 50, 60, 70, 80, 90, 100, 110, 120, 130, or 140° C. for a time period of, typically, at least 0.5, 1, 2, 5, 10, or 12 hours, and up to 15, 20, 24, 36, 48, or 72 hours, wherein it is understood that higher temperatures generally require shorter time periods.

In particular embodiments, it may be preferred to subject the precursors to an initial lower temperature curing step followed by a higher temperature curing step. The initial curing step may employ a temperature of about, for example, 50, 60, 70, 80, 90, or 100° C. (or a range between any of these), while the subsequent curing step may employ a temperature of about, for example, 90, 100, 110, 120, 130, or 140° C. (or a range between any of these), provided that the temperature of the initial curing step is less than the temperature of the subsequent curing step. In addition, each curing step can employ any of the exemplary time periods provided above.

Alternatively, it may be preferred to gradually increase the temperature during the curing step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, or 30° C./min, or any suitable range between any of these values. The gradual temperature increase can also include one or more periods of residency at a particular temperature, and/or a change in the rate of temperature increase.

The carbonization step includes any of the conditions, as known in the art, which cause carbonization of the precursor composition. Generally, in different embodiments, a carbonization temperature of precisely, about, or at least, for example, 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., or 1800° C. (or a range therein) is employed for a time period of, typically, at least 1, 2, 3, 4, 5, or 6 hours and up to 7, 8, 9, 10, 11, or 12 hours, wherein it is understood that higher temperatures generally require shorter time periods to achieve the same result. If desired, the precursor composition, or alternatively, the carbonized material, can be subjected to a temperature high enough to produce a graphitized carbon material. Typically, the temperature capable of causing graphitization is a temperature of or greater than about 2000° C., 2100° C., 2200° C., 2300° C., 2400° C., 2500° C., 2600° C., 2700° C., 2800° C., 2900° C., 3000° C., 3100° C., or 3200° C., or a range between any two of these temperatures. Preferably, the carbonization or graphitization step is conducted in an atmosphere substantially removed of oxygen, e.g., typically under an inert atmosphere. Some examples of inert atmospheres include nitrogen and the noble gases (e.g., helium or argon). Generally, for most purposes of the instant invention, a graphitization step is omitted. Therefore, other conditions that generally favor graphitization (e.g., inclusion of catalytic species, such as iron (III) complexes) are preferably excluded.

In particular embodiments, it may be preferred to subject the precursors to an initial lower temperature carbonization step followed by a higher temperature carbonization step. The initial carbonization step may employ a temperature of about, for example, 300, 350, 400, 450, 500, 550, 600, 650, 700, 750, 800, 850, or 900° C. (or a range between any of these), while the subsequent carbonization step may employ a temperature of about, for example, 500, 550, 600, 650, 700, 750, 800, 850, 900, 950, 1000, 1050, 1100, 1200, 1250, 1300, 1400, 1450, 1500, 1600, 1700, or 1800° C. (or a range between any of these), provided that the temperature of the initial carbonization step is less than the temperature of the subsequent carbonization step. In addition, each carbonization step can employ any of the exemplary time periods given above.

Alternatively, it may be preferred to gradually increase the temperature during the carbonization step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase.

In particular embodiments, after combining the components of the precursor composition, and before curing or carbonization, the solution is stirred for a sufficient period of time (e.g., at least or about 1, 2, 5, 10, 20, 30, 40, 50, 60, 90, or 120 minutes, or a range between any these values) until a gel-like phase is formed, which is typically evidenced by an increased turbidity in the solution. The turbidity generally indicates formation of an ordered nanocomposite gel or solid that has undergone a degree of phase separation from the liquid portion of the solution. If desired, stirring can be continued after the onset of turbidity, such that the total amount of stirring time before curing, carbonization, or a phase-separation process is any of the exemplary time periods given above, or a longer period of time, such as several hours (e.g., at least or about 4, 5, 6, 7, 8, 10, or 12 hours) or days (e.g., at least or about 1, 2, 3, 4, 5, 10, 15, or 20 days), or a range between of the foregoing exemplary periods of time.

After turbidity becomes evident, the phase-separated mixture can be subjected to conditions that cause the ordered nanocomposite gel or solid to be substantially removed or isolated from the liquid portion. Any separation method can be applied herein. For example, the phases can be separated by centrifugation. In different embodiments, the centrifugation can be conducted at an angular speed of precisely, at least, about, or up to, for example, 2000 rpm, 2500 rpm, 3000 rpm, 4000 rpm, 5000 rpm, 6000 rpm, 7000 rpm, 8000 rpm, 9000 rpm, 9500 rpm, 10000 rpm, 11000 rpm, 12000 rpm, or 15000 rpm, or a range between any of these values, for a period of time of, for example, 0.1, 0.2, 0.5, 1, 2, 3, 4, 5, or 6 minutes, wherein it is understood that higher angular speeds generally require less amounts of time to effect an equivalent degree of separation. Superspeed centrifugation (e.g., up to 20,000 or 30,000 rpm) or ultracentrifugation (e.g., up to 40,000, 50,000, 60,000, or 70,000 rpm) can also be used. The gel or solid phase, once separated from the liquid phase, is then cured and carbonized in the substantial absence of the liquid phase according to any of the conditions described above for these processes.

Particles of the porous carbon material can be produced instead of a film. The particles can be produced by any suitable method, such as, for example, the spray atomization techniques known in the art which also include a capability of heating at carbonization temperatures. For example, the precursor composition described above (typically, in a carrier solvent, such as THF or DMF) can be sprayed through the nozzle of an atomizer, and the particulates directed into one or more heated chambers for curing and carbonization steps. Alternatively, a portion of the precursor composition (e.g., templating agent and one of the polymer precursors, such as the phenolic component) may first be atomized and the resulting particles annealed (i.e., dried) by suitable conditions; the resulting particles may then be exposed to the other polymer precursor (e.g., dione component) and subjected to acidic conditions, followed by curing and carbonization steps.

The hierarchical porous carbon material may also be functionalized, as desired, by methods known in the art for functionalizing carbon or graphite materials. For example, the porous carbon material may be nitrogenated, fluorinated, or oxygenated by methods known in the art. The porous carbon material may be nitrogenated, fluorinated, or oxygenated, by, for example, exposure of the porous carbon film, either during or after the carbonization process, to, respectively, ammonia gas, fluorine gas, or oxygen gas under suitably reactive conditions. In the particular case of fluorination, the carbon material is typically placed in contact with fluorine gas for a period of several minutes (e.g., 10 minutes) up to several days at a temperature within 20° C. to 500° C., wherein the time and temperature, among other factors, are selected based on the degree of fluorination desired. For example, a reaction time of about 5 hours at ambient temperature (e.g., 15-30° C.) typically results in fluorination of about 10% of the total carbon; in comparison, fluorination conducted at about 500° C. for two days results in about 100% fluorination of the total carbon. In particular embodiments, the degree of nitrogenation, fluorination, or oxygenation can be about or at least 1%, 2%, 5%, 10%, 20%, 30%, 40%, 50%, 60%, 70%, 80%, 90%, 95%, or 100%, or a range between any two of these values.

In another aspect, the invention is directed to a capacitive deionization (CDI) device that includes the porous carbon material (described above) in one or two electrodes of the CDI device. The invention is also directed to a method for desalinating water by electrically operating the CDI device. The invention is also directed to a method of energy storage by using the porous carbon material described herein in a capacitive device, such as a battery, supercapacitor, or electric double layer capacitor (EDLC).

The hierarchical porous carbon material described herein is included in at least one electrode of the CDI or related device (e.g., EDLC device). In one embodiment, at least one (or both, a portion, or all) of the electrodes is constructed of the hierarchical porous carbon material, except perhaps for the current collector. In another embodiment, the hierarchical porous carbon material is in the form of a coating on a suitable base electrode material (or current collector). The base electrode material or current collector is often a conductive carbon material, such as graphite or carbon paper. In yet another embodiment, the hierarchical porous carbon material is in the form of a layer covered by a layer of another porous material, such as a mesoporous carbon material, carbon foam, or porous graphite. In some embodiments, a titanium sheet current collector is used. In other embodiments, a composite material (e.g., activated carbon powder and a thermoplastic material, such as PTFE) is used as the base electrode or current collector.

In some embodiments, the hierarchical porous carbon material described herein, without admixture with another carbon material, is used as the electrode or coated on a base electrode or current collector. In other embodiments, the hierarchical porous carbon material described herein is admixed with one or more other carbon materials (e.g., activated carbon, a mesoporous carbon, a carbon foam, or a carbon aerogel). When admixing is desired, the porous carbon material is typically in a particulate form, such as a powder.

A CDI device generally includes at least the feature of two porous electrodes of opposite polarity spaced in such a manner that flowing liquid (typically water, or an aqueous solution containing water) makes contact with the electrodes. In some embodiments, the electrodes are separated by an insulating material that permits the flow therethrough of water to be deionized by inclusion of flow channels in the insulating material. The insulating material includes means (e.g., spaces, channels, or pores) that permit the liquid to make efficient contact with the porous electrodes. When operated (i.e., by applying a suitable voltage bias across the electrodes), the CDI device removes salt species from the water by absorbing cationic species into the negatively charged electrode and anionic species into the positively charged electrode, similar to a capacitor, such as a supercapacitor or EDLC, both of which are additional applications for the hierarchical porous carbon materials described herein. The base electrode material can be any suitable electrically conductive material, including any of the substrate materials described above, provided the substrate material permits the CDI device to desalinate water. In particular embodiments, the base electrode material is porous.

The CDI device can have any of the features and designs known in the art. See, for example, U.S. Pat. No. 5,636,437, U.S. Pat. No. 5,776,633, U.S. Pat. No. 5,932,185, U.S. Pat. No. 5,954,937, U.S. Pat. No. 6,214,204, U.S. Pat. No. 6,309,532, U.S. Pat. No. 6,778,378, U.S. Pat. No. 7,766,981, U.S. Pat. No. 7,835,137, U.S. Application Pub. No. 2008/0274407, U.S. Application Pub. No. 2009/0141422, U.S. Application Pub. No. 2009/0305138, U.S. Application Pub. No. 2009/0320253, Jung, et al., *Desalination*, 216, pp. 377-385 (2007), R. W. Pekala, et al., *Journal of Non-Crystalline Solids*, 225, pp. 74-80 (1998), and D. Carriazo, et al., *J. Mater. Chem.*, 20, pp. 773-780 (2010), all of which describe numerous features and designs in CDI, EDLC, and related devices, as well as numerous methods for fabricating electrodes in such devices, as well as methods of operating CDI, EDLC and related devices. The variations and designs of CDI devices, as well as methods of manufacture, and methods of their use, described in the foregoing references, are herein incorporated by reference in their entirety. In some embodiments, one or more features described in said references are excluded from the instant CDI device. Furthermore, in some embodiments, two electrodes are employed, while in other embodiments, more than two, or a multiplicity of electrodes (for example, miniaturized electrodes) are employed. In some embodiments, the electrodes are in a stacked arrangement, such as an alternating left-right arrangement to maximize flow rate. In particular embodiments, the CDI device is a membrane capacitive deionization (MCDI) device by employing an anion-exchange membrane coated on the anode and/or a cation-exchange membrane coated on the cathode, wherein the anion- or cation-exchange membrane is generally positioned between the flowing water and respective electrode. In other embodiments, such exchange membranes are excluded from the device.

In other aspects, the hierarchical porous carbon materials described herein are used as chromatography media, particularly for use in HPLC, and more particularly, for use in electrochemically modulated liquid chromatography (EMLC), as described, for example, in U.S. Pat. No. 7,449,165, the contents of which are incorporated herein by reference in their entirety.

Examples have been set forth below for the purpose of illustration and to describe certain specific embodiments of the invention. However, the scope of this invention is not to be in any way limited by the examples set forth herein.

Example 1

Preparation of a Hierarchical Porous Carbon Film by Reacting Phloroglucinol and Glyoxal Phloroglucinol, tetrahydrofuran (THF), and Pluronic F-127 were obtained from Sigma-Aldrich. Ethanol (200 proof) was obtained from VWR Scientific, and glyoxal was obtained from Alfa Aesar.

In a typical experiment, 1.15 g phloroglucinol (9.12 mmol) and 1.15 g Pluronic F-127 were dissolved in 4.5 mL ethanol (200 proof) and 4.5 mL of 3M HCl. Once dissolved, 1.3 mL of 40 wt. % aq. glyoxal solution (11.33 mmol) was added and the mixture stirred. Phase separation was observed 20 minutes after glyoxal addition. The mixture was stirred for an additional 30 minutes after phase separation, and then the gel and solvent were transferred to a centrifuge tube. The gel was separated from the solvent by centrifugation at 9600 RPM for six minutes. The solvent was then decanted off the gel layer and 0.5 g THF and 2.0 g ethanol (200 proof) was added. After mixing, the gel was cast onto glass Petri dishes and allowed to dry in a fume hood overnight. The gel was then cured at 353 K for 24 hours followed by carbonization at 1123 K for 2 hours (2 K/min ramp rate) in a nitrogen atmosphere.

Example 2

Analysis of the Hierarchical Porous Carbon Material

Phloroglucinol is reported to react faster than resorcinol or phenol with formaldehyde (see, for example, P. Xu, et al., *Water Res.*, 2008, 42, 2605-2617, and X. Q. Wang, et al., *Langmuir*, 2008, 24, 7500-7505). Although phloroglucinol is attractive for its potential in producing ordered porous carbon materials, the increased reaction rate can lead to a disordered and non-hierarchical porous carbon, among other detrimental effects for the purposes of the instant invention. To obtain an ordered porous carbon, the fast reactivity of phloroglucinol has been compensated by a slower reacting aldehyde than formaldehyde. Glyoxal is a slow reacting aldehyde, potentially due to the possible enol tautomerization, described above, that can stabilize a reaction intermediate structure and hinder further crosslinking. Therefore, based solely on condensation reactivity, the fast reacting phloroglucinol and slow reacting glyoxal were found herein to be a beneficial pairing.

Surface Area Analysis

Nitrogen sorption analysis was performed on a Micromeritics Tristar 3000 at 77 K. Prior to measurement, the samples were degassed at 423 K under flowing nitrogen. The specific surface area was calculated using the Brunauer-Emmett-Teller (BET) equation utilizing the adsorption branch. The pore size distribution plot was derived from the adsorption branch of the isotherms using the Barret-Joyner-Halenda (BJH) method.

As shown in FIG. 1, nitrogen sorption isotherms with a hysteresis loop indicating the presence of mesopores were obtained from the carbonized phloroglucinol-glyoxal polymer produced in Example 1. The surface area was comparable to that of resorcinol-formaldehyde carbons synthesized by a similar method at 410 $m^2/g$ (see X. Q. Wang et al., 2008, Ibid.). The narrow (BJH) pore size distribution centered on 7.5 nm is indicative of the well-ordered templated structure (inset of FIG. 1).

Raman Spectroscopy Analysis

Figure 2:
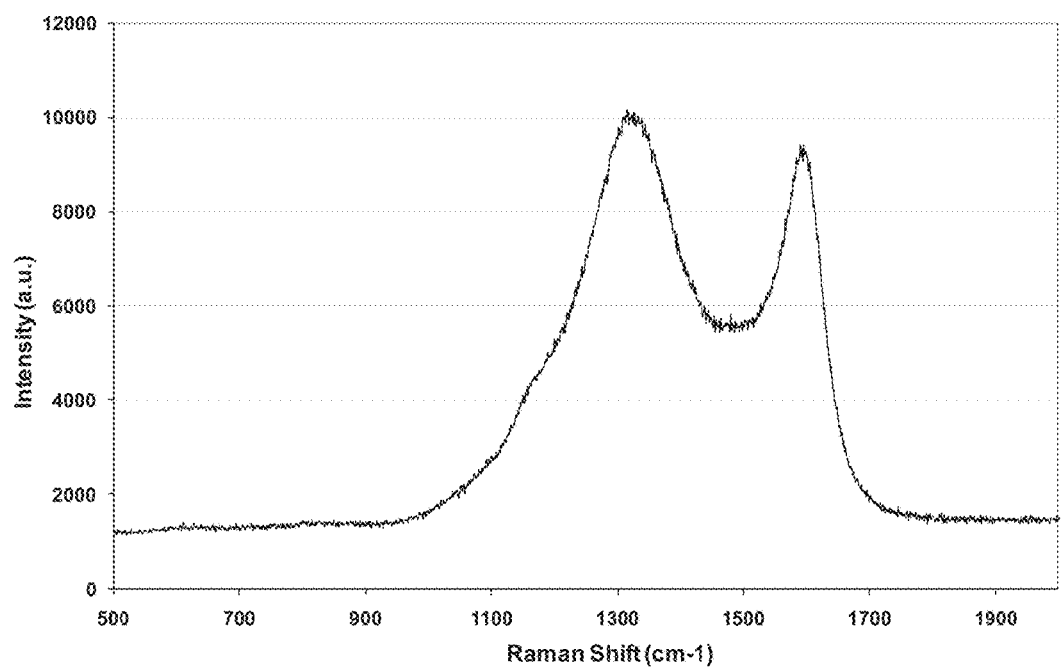
FIG. 2. Raman spectrum of hierarchical porous carbon produced from reaction of phloroglucinol and glyoxal.

Raman measurements on the porous carbon produced in Example 1 were collected with a Renishaw System 1000 microscope using a 632 nm He—Ne laser (25 mW power) and a 50× objective. Raman spectroscopy is widely used to probe the amount of graphitic vs. amorphous carbon via two bands that have become the "fingerprint" regions for carbon materials. The I(G) band identified as the graphitic carbon, is centered around 1600 $cm^{-1}$ and is attributed to $sp^2$ carbon. The I(D) band identified with amorphous carbon is attributed to $sp^a$ carbon. The Raman spectrum (FIG. 2) of the carbonized material displayed two features, a sharp band centered on 1600 $cm^{-1}$ and the second feature centered on 1330 $cm^{-1}$. These two features correspond to the graphitic ($I_G=1600$ $cm^{-1}$) and disordered carbon ($I_D=1330$ $cm^{-1}$) structures associated with carbon materials. A shoulder on the I(D) band located near 1170 $cm^{-1}$ is also attributed to the disordered carbon structures.

Scanning Transmission Electron Microscopy (STEM) Analysis

Figure 3:
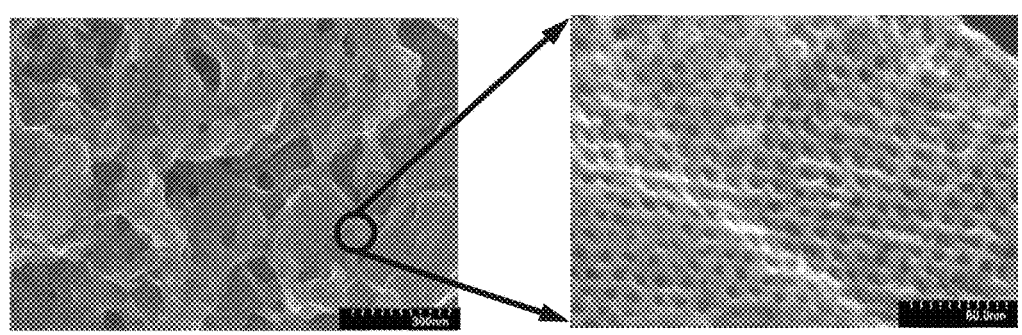
FIG. 3. STEM images of hierarchical porous carbon produced from reaction of phloroglucinol and glyoxal.

Scanning transmission electron microscope (STEM) images were collected on a Hitachi HD2000 STEM. Scanning transmission electron microscopy (STEM) was used to gain further insight into the porous structure of the carbon produced in Example 1. As shown by the STEM images in FIG. 3, the carbon possesses a hierarchical porosity. In particular, in addition to the 7.5 nm mesopores, as also revealed by nitrogen adsorption analysis, larger pores with diameters up to 200 nm were present. While glyoxal was not expected to produce a hierarchical structure, the presence of the pores larger than 50 nm, observed by STEM microscopy, are suggestive of a bimodal porous network. Previous work on hierarchical carbon often involves the decomposition of a secondary porogen, as occurs with spinodal decomposition, to create the secondary porous structure or the use of hydrothermal techniques (see, for example, C. D. Liang, et al., *Chem. Mater.*, 2009, 21, 2115-2124; P. Adelhelm, et al., *Adv. Mater.*, 2007, 19, 4012; D. Carriazo, et al., *J. Mater. Chem.*, 2010, 20, 773-780; and Y. Huang, et al., *Chem. Commun.*, 2008, 2641-2643). The benefits and advantages of producing a hierarchical porous carbon material by a facile method at room temperature and without toxic formaldehyde are significant.

Example 3

Preparation of Electrodes Containing a Hierarchical Porous Carbon Film Produced by Reacting Phloroglucinol and Glyoxal Graphite plates were used as dual current collector and electrode supports for the carbon. The active area for the CDI electrode was 103.2 $cm^2$ and was roughened to facilitate adhesion of the gel to the graphite. Phloroglucinol (8.00 g, 63.4 mmol) and Pluronic F-127 (8.00 g) were dissolved in 34 mL ethanol (200 proof) and 34 mL of 3M hydrochloric acid. Glyoxal (9.8 mL, 85.4 mmol) was added and the solution allowed to stir for 50 minutes. Phase separation was observed at 20 minutes after glyoxal addition. After 50 minutes, the gel mixture was allowed to set for 1-2 minutes to allow further phase separation from the solvent. The solvent was decanted and the gel spread onto the active area of the graphite electrodes. The porous carbon-coated graphite electrodes were allowed to dry overnight at room temperature, and then cured at 353 K for 24 hours. The plates were then carbonized at 1123 K under argon. Each graphite plate consisted of approximately 5.0 g of porous carbon in the active area.

Example 4

Capacitive Deionization (CDI) Experiments

Capacitive deionization experiments were conducted using an electrosorption cell that consisted of a pair of graphite electrodes coated with a hierarchical porous carbon, as described in Example 3. A separation distance between the two electrodes was maintained by using a polycarbonate sheet spacer (hollow at the center) of 6.4-mm thickness at the center of the cell. The assembly of one-half of the electrochemical cell followed this sequence: polycarbonate sheet endplate (9.5 mm thick), neoprene sheet gasket (1.6 mm thick), graphite electrode (3.2 mm thick) with the porous carbon coating, and neoprene sheet gasket (1.6 mm thick; hollow at the center). The distance between the current collectors was 9.6 mm, which is the same as the thickness of the polycarbonate spacing (6.4 mm) plus the thickness of two neoprene gasket sheets (1.6-mm each). The distance between the material on the graphite electrodes depended on their thickness. The graphite plates were connected to a power supply (HP E3632A). The thickness of the porous carbon film was approximately 2 mm.

The potential difference applied to the two electrodes was 1.2 V. This potential was applied 600 seconds after the data acquisition started, and led to an effective removal of ions without causing electrochemical reactions and high current. Instant Ocean® (Aquarium Systems) solutions of various concentrations in deionized water were used in capacitive deionization experiments. In each experiment, the solution was continuously pumped through the electrosorption cell by a pump at a flow rate of 30 mL/min. The solution conductivity was monitored at the outlet of the cell by using an electrical conductivity probe connected to a meter (Amber Science 3082). After the conductivity meter, the solution was collected by a beaker and then recycled through the cell by the pump. A volume of 100 mL was used in each experiment. The conductivity meter and power supply were connected to a data acquisition system (National Instruments USB-6008) and data were stored in the hard-drive of a laptop computer.

Example 5

Capacitive Deionization (CDI) Results

Figures 4A, 4B:
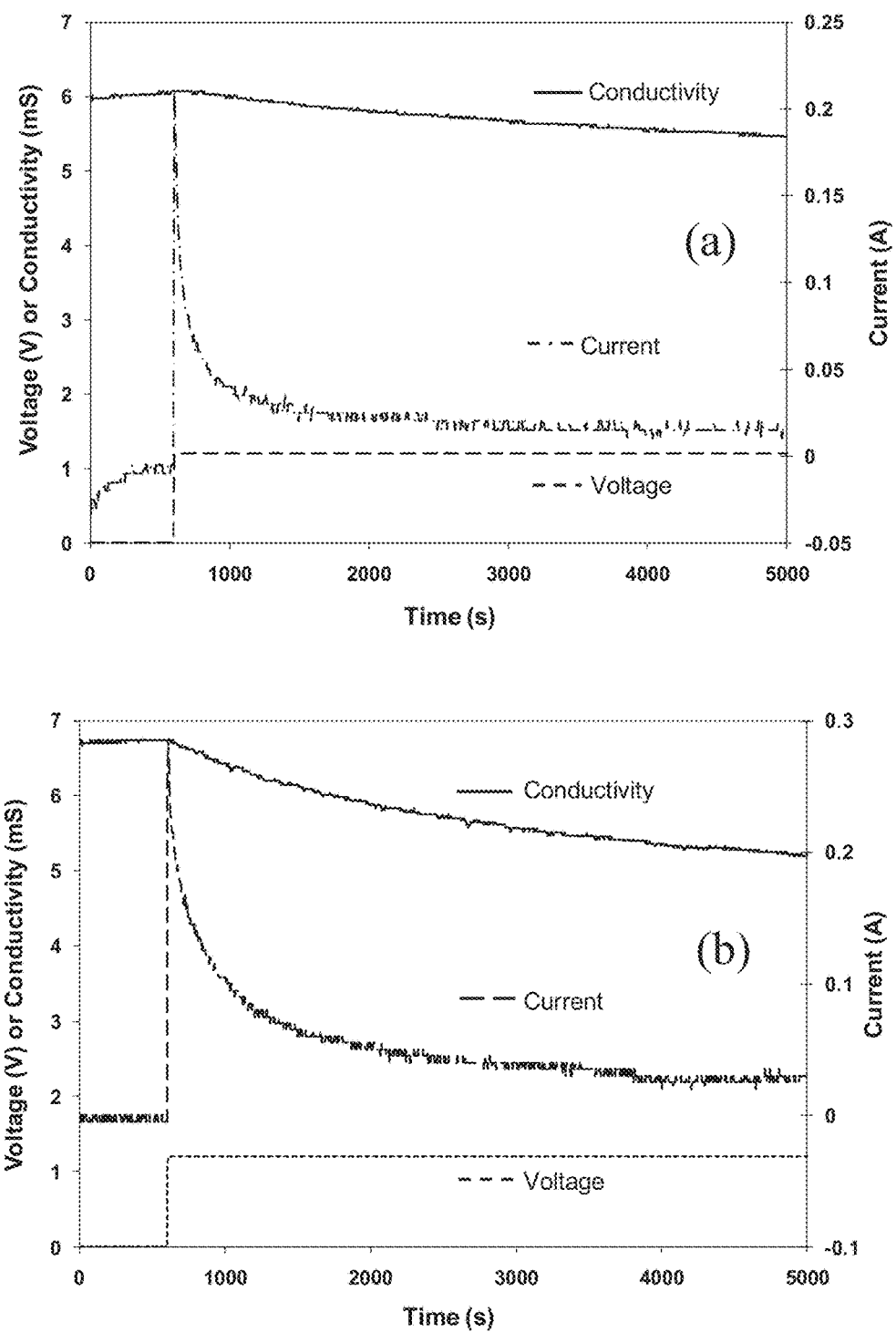
FIGS. 4A, 4B. Capacitive deionization results for (a) a representative resorcinol-formaldehyde mesoporous carbon of the art, and (b) the phloroglucinol-glyoxal hierarchical porous carbon produced herein.

Representative capacitive deionization results are shown in FIGS. 4A and 4B. FIG. 4A shows CDI results for resorcinol-formaldehyde mesoporous carbon-coated graphite of the art, as synthesized according to X. Q. Wang et al., 2008, Ibid. FIG. 4B shows CDI results for phloroglucinol-glyoxal hierarchical carbon-coated graphite, as produced and analyzed herein in accordance with Examples 3 and 4. The initial concentration of Instant Ocean® was 3,967 ppm for the experiment presented in FIG. 4A and 4,464 ppm for the experiment presented in FIG. 4B. The final concentration was 2,569 ppm for the experiment presented in FIG. 4A and 3,069 ppm for the experiment presented in FIG. 4B. A material balance revealed that the mesoporous resorcinol-formaldehyde carbon-coated graphite in the experiment of FIG. 4A removed 146.8 mg of salt, while the phloroglucinol-glyoxal carbon-coated graphite in the experiment of FIG. 4B removed 139.5 mg of salt. The results of these experiments were similar, except for the kinetics of ion uptake by the electrodes. In the first experiment (FIG. 4A), within 1000 seconds, the solution conductivity dropped by 0.19 mS; whereas in the second experiment (FIG. 4B), for the same period of time, the solution conductivity dropped 0.67 mS. Hence, the initial slope of ion uptake by the phloroglucinol-glyoxal carbon of the instant invention was more than three times the slope of the resorcinol-formaldehyde carbon of the art.

The similarity in the ion capacity is related to the similar pore sizes found in the resorcinol-formaldehyde carbon material of the art and phloroglucinol-glyoxal carbon material produced herein. In turn, the similar pore sizes results predominantly from use of the same structure template, i.e., Pluronic F127. XPS analysis of the carbon materials has indicated similar surface functionalities between the carbon samples, suggesting the difference in ion uptake and kinetics is not due to different surface functionalities. However, the three-times (3×) increase in ion uptake kinetics is most likely due to the hierarchical structure of the instant phloroglucinol-glyoxal carbon. Therefore, it has been shown that the hierarchical porous carbon produced herein is advantageous over resorcinol-formaldehyde carbon materials of the art for capacitive deionization.

In conclusion, these Examples demonstrate that phloroglucinol reacts with glyoxal in the presence of the triblock copolymer Pluronic F127 to form a hierarchical porous carbon material with an ordered, well-defined mesoporous component. This is the first known reported synthesis of a "hard carbon" based on glyoxal, as well as the templating of a phenolic-glyoxal resin. The hierarchical porosity in the porous carbon materials produced in the above Examples has been found to contain macropores up to 200 nm, as well as mesopores of 7.5 nm. Moreover, the 7.5 nm mesopores are highly uniform in size. Significantly, the hierarchical structure has been provided by the crosslinking reagent (i.e., dione) and not by the use of a secondary porogen undergoing spinodal decomposition, as commonly relied upon in the art. Thus, a new and superior methodology for synthesizing hierarchical carbon materials has herein been described wherein the crosslinking reagent, as opposed to the templating agent, exerts a dominant effect on the porous structure. Moreover, as demonstrated above, capacitive deionization tests indicate that the hierarchical porous carbon material produced herein is a better CDI electrode than that of mesoporous resorcinol-formaldehyde carbon materials of the art for removal of salts from brackish water due to faster ion uptake kinetics.

While there have been shown and described what are at present considered the preferred embodiments of the invention, those skilled in the art may make various changes and modifications which remain within the scope of the invention defined by the appended claims.

What is claimed is:

1. A capacitive deionization device comprised of first and second electrodes and a space between said electrodes for the flow of water, wherein at least one of said first and second electrodes is comprised of a porous carbon material possessing a hierarchical porosity comprised of mesopores and macropores, wherein said mesopores have a size in the range of 6-10 nm along with a substantial absence of mesopores having a size above 10 nm and up to 50 nm, and said macropores have a size of at least 75 nm and up to 500 nm.

2. The capacitive deionization device of claim 1, wherein said macropores have a size in the range of 100-500 nm.

3. The capacitive deionization device of claim 1, wherein said electrodes are separated by an insulating material, wherein said insulating material permits the flow therethrough of water to be deionized while permitting contact of the water with each of said first and second electrodes.

4. The capacitive deionization device of claim 1, wherein at least a portion of said porous carbon material is amorphous.

5. The capacitive deionization device of claim 1, wherein at least one of said electrodes is comprised of said porous carbon material possessing a hierarchical porosity disposed as a film on a base electrode substrate material.

6. The capacitive deionization device of claim 5, wherein said film has a thickness of up to 5 millimeters.

7. The capacitive deionization device of claim 5, wherein said film has a thickness of up to 100 microns.

8. The capacitive deionization device of claim 5, wherein said base electrode substrate material is comprised of an electrically conductive carbon material.

9. The capacitive deionization device of claim 8, wherein said electrically conductive carbon material is graphite.

10. The capacitive deionization device of claim 1, wherein said mesopores have a pore size distribution having a peak at about 7.5 nm.

11. The capacitive deionization device of claim 1, wherein said macropores have a size up to 200 nm.

12. A method for the desalination of water, the method comprising:

providing a capacitive deionization device comprised of first and second electrodes and a space between said first and second electrodes for the flow of water, wherein at least one of said first and second electrodes is comprised of a porous carbon material possessing a hierarchical porosity comprised of mesopores and macropores, wherein said mesopores have a size in the range of 6-10 nm along with a substantial absence of mesopores having a size above 10 nm and up to 50 nm, and said macropores have a size of at least 75 nm and up to 500 nm; and flowing water in need of desalination through said capacitive deionization device when the first and second electrodes of said capacitive deionization device are in electrical operation to configure them as anode and cathode.

13. The method of claim 12, wherein said macropores have a size in the range of 100-500 nm.

14. The method of claim 12, wherein said electrodes are separated by an insulating material, wherein said insulating material permits the flow therethrough of water to be deionized while permitting contact of the water with each of said first and second electrodes.

15. The method of claim 12, wherein at least a portion of said porous carbon material is amorphous.

16. The method of claim 12, wherein at least one of said electrodes is comprised of said porous carbon material possessing a hierarchical porosity disposed as a film on a base electrode substrate material.

17. The method of claim 16, wherein said film has a thickness of up to 5 millimeters.

18. The method of claim 16, wherein said film has a thickness of up to 100 microns.

19. The method of claim 16, wherein said base electrode substrate material is comprised of an electrically conductive carbon material.

20. The method of claim 19, wherein said electrically conductive carbon material is graphite.

21. The method of claim 12, wherein said macropores have a size up to 200 nm.

\* \* \* \* \*